July 29, 1924.
E. R. BURTNETT
1,503,185
PISTON VALVE STRUCTURE FOR INTERNAL COMBUSTION ENGINES
Filed Feb. 3, 1922    2 Sheets-Sheet 1
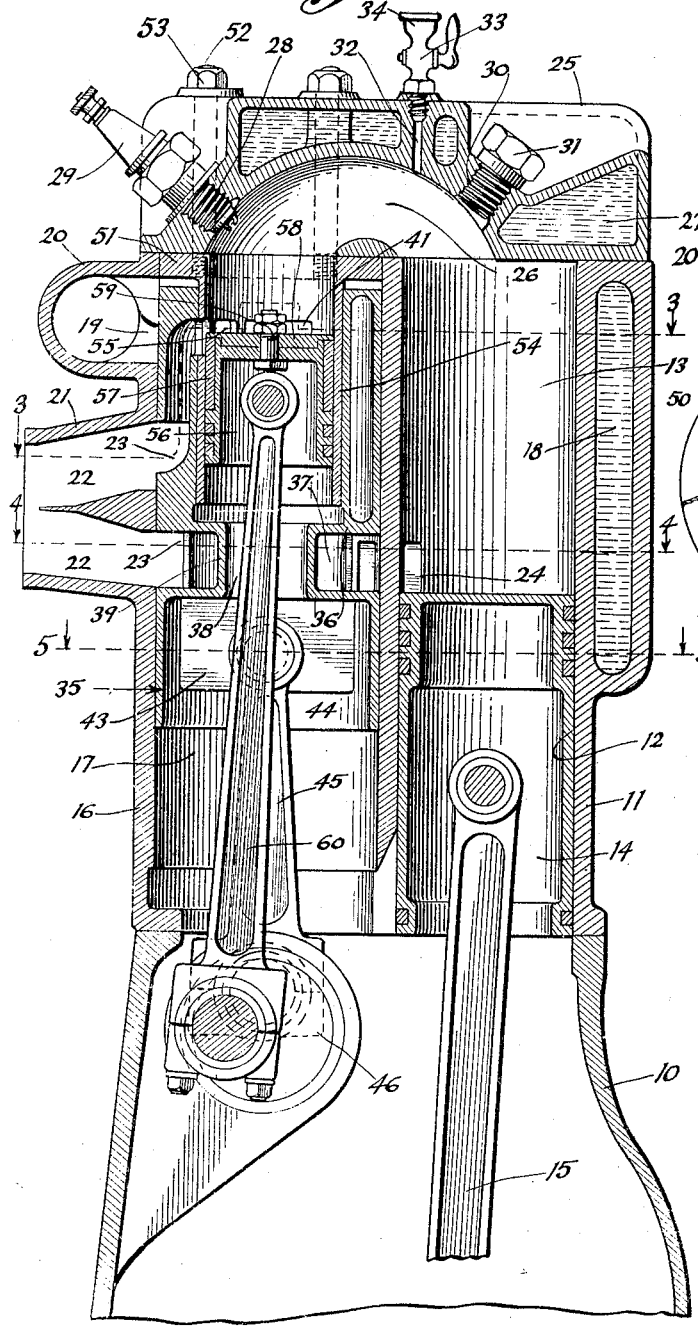
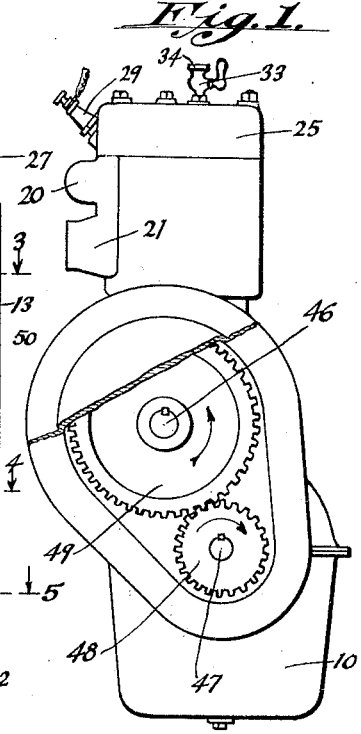
Inventor.
Everett R. Burtnett
By Hazard & Miller
Attorneys July 29, 1924.
E. R. BURTNETT
1,503,185
PISTON VALVE STRUCTURE FOR INTERNAL COMBUSTION ENGINES
Filed Feb. 3, 1922
2 Sheets-Sheet 2
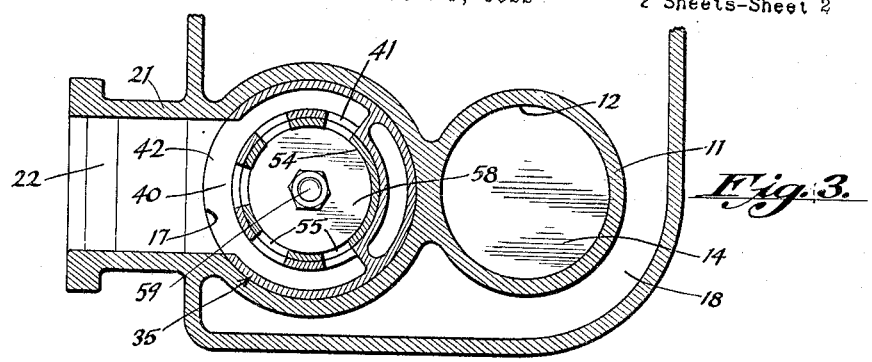
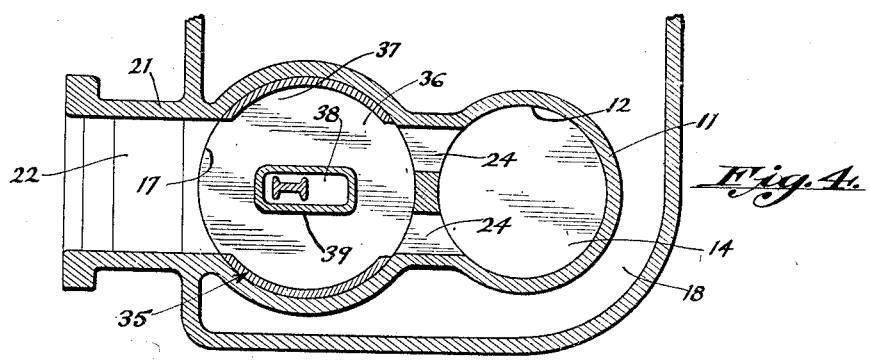
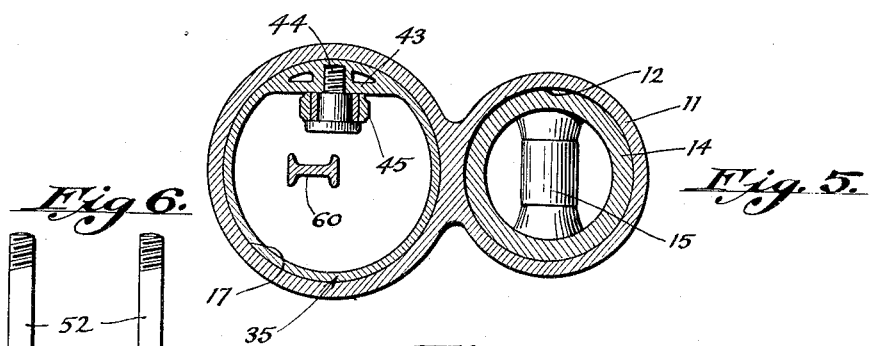
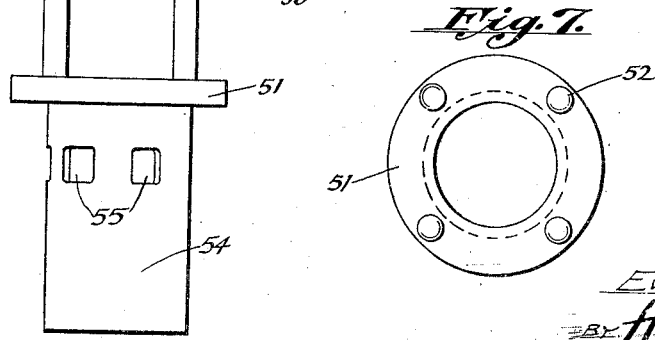
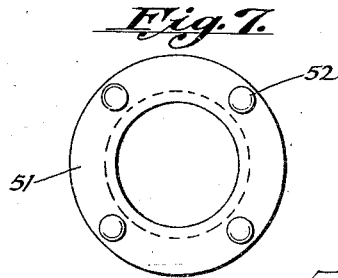
Inventor
EVERETT R. BURTNETT
By Hazard & Miller
Attorneys Patented July 29, 1924.

1,503,185

UNITED STATES PATENT OFFICE.

EVERETT R. BURTNETT, OF LOS ANGELES, CALIFORNIA, ASSIGNOR OF ONE-HALF TO HOMER A. BRUNELL, OF LOS ANGELES, CALIFORNIA.

PISTON-VALVE STRUCTURE FOR INTERNAL-COMBUSTION ENGINES.

Application filed February 3, 1922. Serial No. 533,852.

*To all whom it may concern:*

Be it known that I, EVERETT R. BURTNETT, a citizen of the United States, residing at Los Angeles, in the county of Los Angeles and State of California, have invented new and useful Improvements in Piston-Valve Structures for Internal-Combustion Engines, of which the following is a specification.

My invention relates to internal combustion engines of the general type disclosed in my co-pending applications filed October 14, 1920, Serial No. 416,963, and May 19, 1921, Serial No. 471,010, the principal objects of my present invention being to generally improve upon and simplify the construction of the engines disclosed in my aforesaid applications as well as other similar types of engines, to provide an engine with a valve mechanism of the piston valve type that is positive in action, silent in operation, of relatively simple and substantial construction, and which is constructed and arranged so as to provide a relatively large area of port opening in ratio to the piston displacement.

A further object of my invention is to provide a valve mechanism of the character referred to that is cooled by the inflow of gaseous fuel in addition to the external cooling means such as a fluid cooling medium that circulates through chambers formed in the walls of the engine cylinder.

A further object of my invention is to provide an engine with a combustion chamber having a laterally arranged curved or gooseneck extension which adds materially to the column movement of the gaseous fuel entering the combustion chamber and the exhaust products of combustion discharging from said chamber, said extension being provided with dual spark plugs for ignition means, the combustion chamber being formed partly in the cylinder head, partly in the main cylinder and partly in the upper portion of the piston valve cylinder.

A further object of my invention is to provide a removable piston valve cylinder having an outwardly extending flange fitting into the upper portion of the sleeve manifold selector bore so as to perfectly align the axis of the piston valve cylinder with the axis of the sleeve valve bore or cylinder.

Still further objects of my invention are to provide a piston valve having a removable head cap that is secured to the body of the piston valve and serves as a retainer for a relatively wide expansion or packing ring that is carried by the piston valve, to provide a sleeve valve member having an auxiliary exhaust port passage through the intermediate portion of its structure thereby providing a much greater and freer passage than is found in the generally used valves of the type to which my invention relates, to provide a relatively large exhaust passageway for the burnt gases and products of combustion that are discharged from the combustion chamber, and to provide improved means for supporting the wrist pin in the lower portion of the sleeve manifold selector.

With the foregoing and other objects in view my invention consists in certain novel features of construction and arrangement of parts that will be hereinafter more fully described and claimed and illustrated in the accompanying drawings in which, Fig. 1 is a elevational view of an internal combustion engine of my improved construction with parts thereof broken away in order to more clearly illustrate the gear connections between the engine shaft and the shaft that controls the operation of the manifold selector and piston valve.

Fig. 2 is a vertical section taken through the center of an engine of my improved construction.

Fig. 3 is a horizontal section taken on the line 3—3 of Fig. 2.

Fig. 4 is a horizontal section taken on the line 4—4 of Fig. 2.

Fig. 5 is a horizontal section taken on the line 5—5 of Fig. 2.

Fig. 6 is an elevational view of a relatively fixed sleeve that is arranged between the upper portion of the manifold selector and the piston valve.

Fig. 7 is a top plan view of the fixed sleeve.

Referring by numerals to the accompanying drawings which illustrate a practical embodiment of my invention, 10 designates a crank case that is preferably of cast construction and which is provided with bearings for an ordinary crank shaft. Surmounting this crank case is a cylinder 11 that is provided with an elongated bore or chamber 12, the upper portion thereof serving as a combustion chamber 13. Arranged for reciprocatory movement within the bore or chamber 12 is a piston 14 that is connected to the crank shaft of the engine by an ordinary connecting rod 15. Formed integral with cylinder 11 and arranged immediately adjacent thereto is a cylinder 16 in which is formed a bore or chamber 17, the axis of which is parallel with the axis of bore or chamber 12, and the upper portions of the walls of cylinders 11 and 16 are provided with communicating chambers 18 through which is adapted to circulate a fluid cooling medium such as water.

Formed in the outer portion of the wall of cylinder 16 is a gaseous fuel inlet port 19 that is surrounded by a housing 20 and to which latter may be connected a pipe that leads from a suitable source of gaseous fuel supply, for instance a carburetor. Formed integral with the cylinder 16 immediately below the housing 20 is an extension 21 through which is formed a pair of inclined ducts 22 and which latter communicate with exhaust ports 23 that are formed through the intermediate portion of the wall of cylinder 16.

Formed through the wall that serves as a partition between the cylinders 11 and 16 and preferably in the same horizontal plane with the lower one of the exhaust ports 23, is a plurality of exhaust ports 24 which are uncovered to permit the discharge of burnt gases and products of combustion when piston 14 is at its low center. Secured in any suitable manner on top of the cylinders 11 and 16 is a block 25 that serves as a head for the chambers 14 and 17 in said cylinders and formed in the under side of said head is a substantially inverted U-shaped duct 26 of relatively large cross sectional area and which establishes communication between the upper portion of the combustion chamber 13 and the upper portion of chamber 17. This duct 26 is in effect a lateral extension of the combustion chamber 13.

Block 25 is provided with a series of connected chambers 27 that may communicate with the chambers 18 in the walls of the cylinders 11 and 16 thereby permitting fluid cooling medium to circulate through the head for the purpose of disseminating heat. In the head preferably at a point above the end of duct 26 that communicates with chamber 17 is a threaded aperture 28 that receives the threaded portion of an ordinary spark plug 29, the terminals of which project into said duct 26.

In order to provide dual ignition of the gaseous fuel charges within the engine, a second threaded aperture such as 30 may be formed through head 25 adjacent to the end of duct 26 that communicates with the combustion chamber 13 and which threaded aperture may receive an ordinary spark plug, or if but a single spark plug is utilized the same is located in threaded aperture 28 and the aperture 30 is closed by a suitable screw plug 31.

Formed through the head 25 and leading upwardly from duct or auxiliary combustion chamber 26 is a relatively small duct 32 that communicates with an ordinary petcock 33 that is seated in head 25 and which is provided with a priming cup 34.

Arranged for reciprocatory movement within chamber 17 is a cylindrical member 35 that performs the functions of a manifold selector that is open at both ends and the internal diameter of the upper portion thereof being less than the diameter of the lower portion. Formed integral with the wall of cylinder 35 and preferably between the upper and lower portions having different internal diameters is a pair of horizontally disposed partitions 36 that are spaced apart to form an annular chamber 37 and which latter is adapted to communicate with the exhaust ports 24 and with the lower one of the exhaust ports when the cylinder is at its high center.

Formed through the central portions of the partitions 36 is an opening 38 around which is formed a vertically disposed wall 39 and which opening 38 is for the accommodation of a piston valve connecting rod.

Formed in the upper portion of the wall of cylinder 35 is an arcuate chamber 40 and formed through the inner portion of the wall and communicating with the upper portion of said arcuate chamber is a series of ports 41. Leading outwardly from the lower portion of the arcuate chamber 40 and through the wall of cylinder 35 is a port 42 that is adapted to communicate with the upper one of the exhaust ports 23 when the manifold selector is at its high center and with the lower one of said ports 23 when said selector is at its low center.

Formed integral with the lower portion of cylinder 35 and immediately below the lower one of the partitions 36 is a vertically disposed web 43 in which is seated a wrist pin 44 and upon which is journaled the upper end of a connecting rod 45. The lower portion of this connecting rod is journaled on a crank that is formed on a shaft 46, the latter being journaled for rotation in suitable bearings in the upper portion of crank case 10, and said shaft being driven at half the speed of the engine shaft 47 by means of a relatively small pinion 48 that is mounted on the engine shaft and which meshes with a larger pinion 49 that is fixed on shaft 46. These pinions 48 and 49 are contained within a suitable housing 50 that is located on the end of the crank case 10 and on the adjacent portion of the cylinder block.

Seated in the upper end of the chamber 17 is a ring 51 and seated therein are the lower ends of rods 52 that project upwardly through suitable openings formed through head 25 and the upper ends of said rods receiving nuts 53. Formed integral with and depending from the inner edge of ring 51 is a cylindrical member 54 which constitutes a sleeve that fits snugly within the upper portion of the manifold selector. Formed through the upper portion of this sleeve 54 is a series of ports 55 with which ports 41 are adapted to register when the manifold selector is at its high center.

Arranged for reciprocatory movement within the fixed sleeve 54 is a piston valve 56 in the upper portion of the periphery of which is seated a relatively wide expansion ring 57, said ring being retained in position on said piston valve by a head plate 58 that overlies the upper end of the piston valve and with its marginal portion overlying the expansion ring 57. Plate 58 is secured to the top of the piston valve in any suitable manner, preferably by means of a centrally arranged bolt or screw such as 59. This piston valve 56 controls the passage of gaseous fuel and the exhaust of burnt gases and products of combustion through the ports 55 in fixed sleeve 54.

The upper end of the connecting rod 60 is journaled to a wrist pin that is seated in valve 56, said connecting rod passing downwardly through opening 38 in the manifold selector and the lower end of said connecting rod being journaled on a crank on shaft 46 and which crank occupies an angular position of approximately ninety degrees relative to the crank to which connecting rod 45 that actuates the manifold selector is connected.

The operation of my improved engine is as follows:

As shown in Fig. 2, piston 14 is shown at its low center, manifold selector at its high center, and with sleeve valve 56 at an intermediate point on its downward travel. Exhaust ports 24 are fully open and chamber 37 is in full registration with said ports 24. Ports 41 are in full registration with ports 55 and the last mentioned ports are approximately half open by virtue of the intermediate or half-way position of piston 56.

On the succeeding upward stroke of piston 14 the burnt gases and products of combustion resulting from the ignition and burning of the gaseous fuel on the preceding power stroke will be forced out of the combustion chamber 13 as the piston 14 moves upwardly there-through, a portion of said burnt gases finding exit through ports 24, chamber 37, the lower one of ports 23 and lower passage-way 22, and the remaining portion of said burnt gases being forced outwardly through duct or auxiliary combustion chamber 26, ports 55, 41, chamber 40, port 42, the upper one of exhaust ports 23 and adjacent duct or passage-way 22. During this exhaust stroke of piston 14 piston valve 56 is moving downwardly through the latter portion of its downward stroke and manifold selector is moving from its high center downward to an intermediate or half-way point on its downward stroke and when said manifold selector reaches such intermediate or half-way point, ports 41 will have been shifted into positions out of registration with ports 55 and the upper end of manifold selector will have reached a position or plane just below the upper edge of gaseous fuel inlet port 19.

On the succeeding downward or suction stroke of piston 14 gaseous fuel will be drawn through inlet port 19, open ports 41, and which fuel will pass upwardly through duct or auxiliary combustion chamber 26 and into combustion chamber 13. During this suction stroke of piston 14 piston valve 56 is moving upwardly on the first half of its upward movement thereby gradually cutting off the passage of gaseous fuel through ports 55 so that at the end of said suction stroke the further ingress of gaseous fuel is cut off and on the succeeding upward stroke of piston 14 the charge of gaseous fuel will be compressed within the upper portion of combustion chamber 13 and its extension 26.

As piston 14 reaches high center or immediately thereafter, the compressed gaseous fuel charge will be ignited by a spark produced between the terminals of spark plug 29 and which spark is controlled by the timing apparatus associated with the ignition system of the engine, and as the compressed charge is thus ignited the piston will be forced downward upon its power stroke.

Before the piston 14 reaches its low center on its power stroke ports 41 in manifold selector 35 move into position to coincide with ports 55 and piston valve 56 is drawn downward so as to uncover said ports 55, which action relieves the gradually diminishing pressure within the combustion chamber and this action is increased as piston 14 passes below ports 24 which at this time are in register with chamber 37 in the manifold selector.

By removing plug 31 and inserting a spark plug in the threaded aperture 30 the compressed charge of gaseous fuel may be ignited at two widely separated points within the lateral extension of the combustion chamber and which action will materially increase the effectiveness of the engine.

The bores or chambers 12 and 17 in the cylinders 11 and 16 are of uniform diameter through their length and therefore the boring, machining and finishing of said bores or chambers may be very easily accomplished.

The relatively cool fuel gases drawn into the combustion chamber of the engine flow across the top of the piston valve thereby tending to reduce the temperature thereof by counteracting the relatively high temperatures resulting from the combustion of the compressed gaseous fuel charges.

By providing the upper end of the piston valve 56 with a readily removable plate, a relatively wide and heavy expansion ring may be utilized on said piston valve and such arrangement is effective in materially reducing the leakage of fluid pressure between the piston valve and its surrounding sleeve 54.

An internal combustion engine of my improved construction has relatively few parts, is devoid of all poppet valves and their actuating mechanisms, may be easily and cheaply produced, and possesses superior advantages in point of simplicity, durability and general efficiency.

It will be understood that minor changes in the size, form and construction of the various parts of my improved internal combustion engine may be made and substituted for those herein shown and described without departing from the spirit of my invention, the scope of which is set forth in the appended claim.

I claim as my invention:

In an internal combustion engine, a manifold selector having upper and lower portions of different internal diameters, a pair of horizontal partitions spaced apart to form an annular chamber, and arcuate passageways extending from the outer wall of the manifold selector upwardly to the inner wall thereof.

In testimony whereof I have signed my name to this specification.

EVERETT R. BURTNETT.